United States Patent [19]

Butler

[11] Patent Number: 4,634,091

[45] Date of Patent: Jan. 6, 1987

[54] SUPPORT FOR RING LASER GYRO

[75] Inventor: Alfred L. Butler, Thousand Oaks, Calif.

[73] Assignee: Litton Systems, Inc., Beverly Hills, Calif.

[21] Appl. No.: 776,433

[22] Filed: Sep. 16, 1985

[51] Int. Cl.[4] ............................................. F16M 1/00
[52] U.S. Cl. ...................................... 248/637; 248/56; 372/94; 356/350
[58] Field of Search ......................... 248/637, 56, 638; 372/94, 109; 356/350; 403/273, 372, 368, 370

[56] References Cited

U.S. PATENT DOCUMENTS

| | | | |
|---|---|---|---|
| 4,115,004 | 9/1978 | Hutchings et al. | 372/94 |
| 4,267,995 | 5/1981 | McMillan | 248/56 |
| 4,299,363 | 11/1981 | Datschefski | 248/56 |
| 4,411,527 | 10/1983 | Gamertsfelder et al. | 356/350 |
| 4,425,040 | 1/1984 | Ljung et al. | 356/350 |
| 4,436,423 | 3/1984 | Kumar et al. | 372/94 |
| 4,505,006 | 3/1985 | Andre | 248/56 |
| 4,533,248 | 8/1985 | Baumann | 372/94 |
| 4,536,087 | 8/1985 | Shernoff | 356/350 |

Primary Examiner—Richard J. Scanlan, Jr.
Assistant Examiner—Douglas W. Hanson
Attorney, Agent, or Firm—Roy L. Brown

[57] ABSTRACT

The invention uses a laser frame which has a central opening about its sensing axis. There is a structural support member in the shape of two substantially conical frustums attached together at their largest diameter portions, with their axes coaxial, and attached to the periphery of the central opening of the frame. The support member is slotted with axially and radially directed slots to form therebetween axially and radially directed struts. The struts have surfaces at their smallest diameter portions for attachment to a post member. The angles of the frustums and the struts are such that when the support member is attached to a post member, thermal expansion of such post member would produce substantially pure bending of the struts.

12 Claims, 4 Drawing Figures

SUPPORT FOR RING LASER GYRO

BACKGROUND OF THE INVENTION

When using ring lasers as gyros, it is customary to attach three ring lasers to a common mounting structure. The ring laser sensing axes are typically precisely orthogonal.

To ensure precision alignment of the axes of the ring lasers over a large range of temperatures, the mechanical design of the mounting structure of the ring laser must isolate the laser cavity from differential temperature expansion between the material forming the cavity and the metallic mounting base.

Further, to ensure that the alignment is maintained during vibration and acceleration, the mounting structure must be angularly stiff.

Merely mounting the ring lasers to a common support structure is insufficient.

BRIEF DESCRIPTION OF THE INVENTION

The apparatus of the invention is a special support structure for supporting a ring laser. The support structure of the invention is typically fabricated of glass or a glass-ceramic material which is sufficiently stiff and dimensionally stable.

The support structure of this invention comprises two frustums of circular cones attached at their larger ends. The frustums are radially split, or relieved, so that their material flexes for differential thermal expansion while still retaining very accurate mechanical alignment under acceleration and vibration. The support has a circular central opening of each frustum which fits over a mounting post. The outside or larger radius of the support is attached to, and is preferably integral with, the ring laser. The cross section of the two attached frustums forms two legs of a triangle, and the post forms the third leg. The stiff triangular cross section formed by the struts of the frustums and the mounting post is exceptionally rigid.

Because of the bending of the struts, very little strain is transmitted to the gyro frame. Therefore, distortion due to movement of the corner mirrors is minimized. No adhesive or other material is necessary at the interface of the cones, for the apparatus is preferably rigidly connected at the interface. Thus, the ring laser becomes dimesnionally stable over long periods.

In a typical embodiment, the support structure is fabricated of glass. Deflection caused by differential expansion between the supported ring laser and the mounting post is absorbed by each glass flexure as pure bending, eliminating shear stress at the joints between the glass and the adjacent metal. Slots are placed in the conical frustums to remove hoop stress. Relief holes substantially parallel to the axes of the cones are placed at the ends of the slots to prevent further lengthening of the slots.

The support structure of the invention is further advantageous in that it is machined from conical cuts that are fabricated rapidly on a computer controlled lathe. The struts are separated by slots which are cut, typically, with a diamond-loaded wire saw.

The pure bending of the struts when the supporting post expands or contracts produces minimal stress and distortion at the mirror surfaces of the ring lasers, and the laser beam is not affected by such bending.

It is therefore an object of the invention to support a ring laser with angular rigidity.

It is also an object of the invention to achieve such support by an easily machined rigid member having a plurality of substantially conically shaped beams or struts configured into two conical frustums attached by their larger end and separated by radially directed slots.

Other objects will become apparent from the following description, taken together with the accompanying drawings.

DETAILED DESCRIPTION OF THE PREFERRED EMBODIMENT

Figure 1:
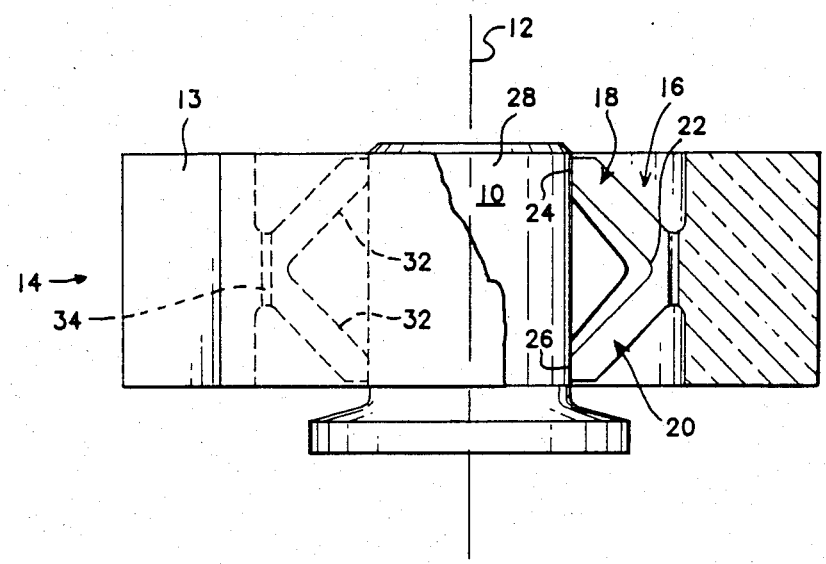
FIG. 1 is a broken view, partly in section, showing the support structure of the invention attached to support post.

FIG. 1 shows an upstanding support post 10 which is merely shown upstanding for convenience. Typically, there will be three such posts attached, for example, to a stabilized platform (not shown) or a vehicle (not shown) with their axes 12 forming an orthogonal set of axes.

Figure 2:
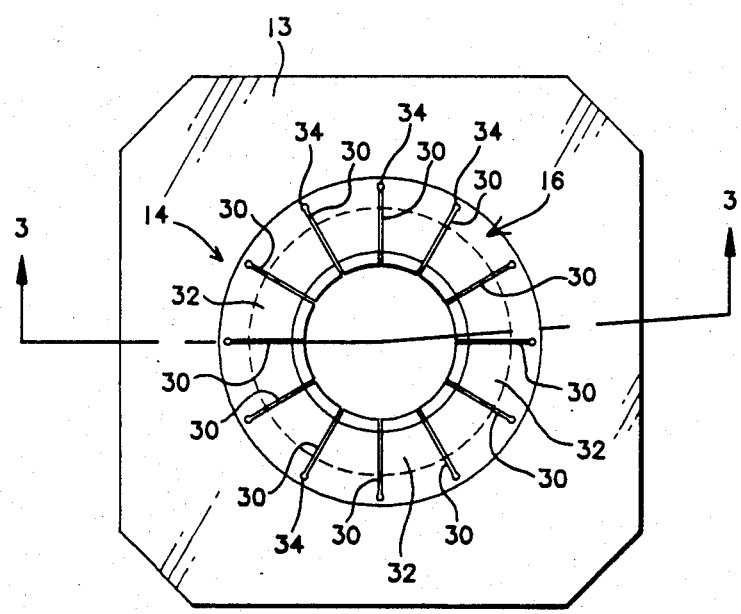
FIG. 2 is a top view of a typical support structure according to the invention.
Figure 3:
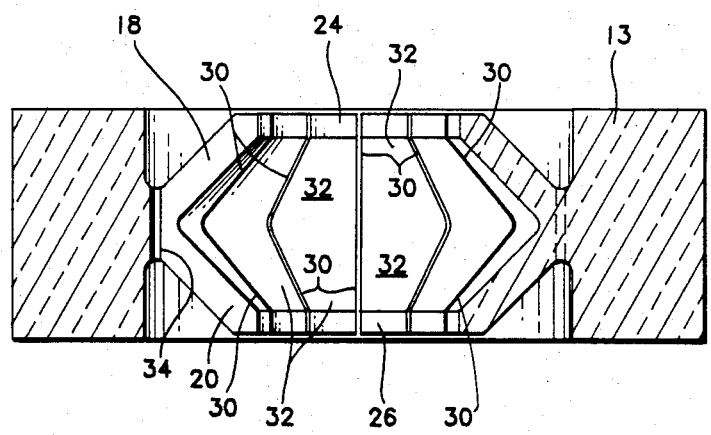
FIG. 3 is a sectional view taken at 3—3 of FIG. 2.

The fixture or support 14 of this invention, shown in plan view in FIG. 2, is rigidly attached to the body 13 of a ring laser. Additional features, such as the mirrors, means for extracting information, means for exciting or means for mechanically dithering the ring laser are also not shown because they are not part of this invention.

The support 14 is formed with a central portion 16 having the shape of two frustums 18, 20 of right circular cones which are attached at their larger ends 22. The design is such that the triangular elements 18 and 20 are at right angles to the expansion of the support post 10.

The frustum portions 18 and 20 are each divided by radially-directed slots 30 into a plurality of splines or fingers 32. Each of the slots 30 is preferably terminated by a stress-relieving axially-directed hole 34.

Figure 4:
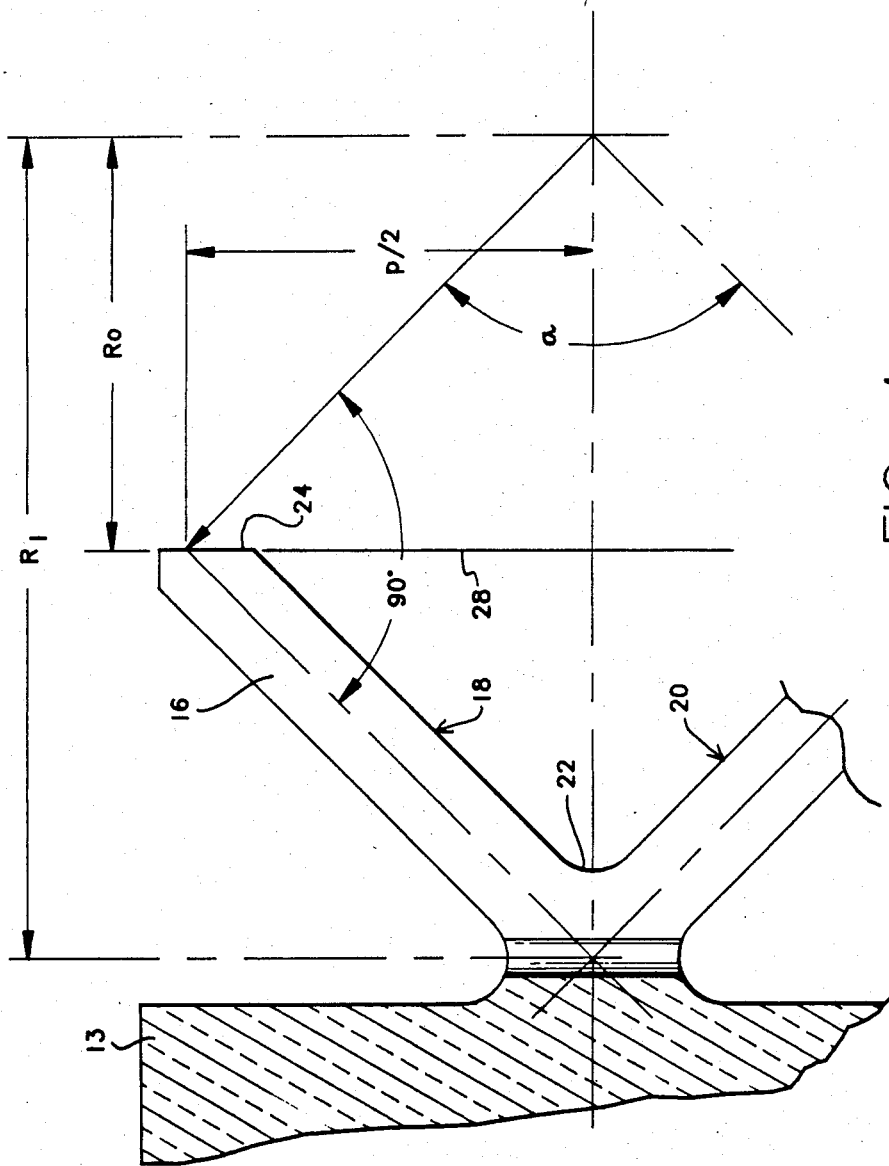
FIG. 4 is an expanded sectional view of the two conical frustums of the structure at their point of attachment.

The FIG. 4 shows the surface 28 of the post 10 and the centerline of the struts or splines 32 of the central portion 16 to be about forty five degrees apart. That angle is not restricted. It may be any angle from zero to ninety degrees depending upon the required axial, radial and torsional stiffness of the mount and of the expansion of the post.

The conically shaped frustum structures 18 and 20 of central portion 16 have circularly cylindrical faces 24, 26 (see FIG. 1) which form a sliding fit over the outside of the circularly cylindrical surface 28 of the post 10 when the apparatus is assembled. The apparatus is typically assembled with the post 10 cooled to a very low temperature. As the post becomes warmer, the fit between the faces 24,26 and the surface 28 becomes an interference fit. The triangular structure, formed on two sides by the conical frustums, 18 and 20, and on the third side by the post 10, is extremely rigid against angular misalignment so that the axis of the fixture 14, and hence the sensing axis of the attached ring laser 13, is coaxial with the axis 12 of the post 10.

In a preferred embodiment, the structure of the invention is fabricated of glass-ceramic or glass, but it may be fabricated of other material so long as the required structural stability is maintained.

In operation, the apparatus, attached to a ring laser (not shown), is positioned onto the post 10. Any stresses caused by temperature, acceleration or other changes are absorbed by the support of this invention as pure flexure of the splines 32 without delivering any torsional distortion to the ring laser 13. No shear stress appears between the glass support and the adjacent metal. To obtain pure flexure, the angles of the struts are chosen so that the forces due to expansion of the post 10 are perpendicular to the struts.

The ring laser is shown attached to the outside of and surrounding the fixture of this invention. Its internal structure need not be described herein, for the operation of the ring laser itself is not a part of the invention.

Although the invention has been described in detail above, it is not intended that the invention be limited by that description, but only according to the appended claims in combination with the specification.

I claim:

1. A support structure for a ring laser comprising: two structural members in the shape of substantially identical frustums of circular cones rigidly attached to each other, with their axes coaxial, at their largest diameter portions;
said members being divided by axially and radially-directed slots into a plurality of struts.

2. A structure as recited in claim 1 in which said struts are substantially identical, and in which said slots are substantially identical.

3. A structure as recited in claim 2 in which each said slot is terminated on its radially outward end by a stress-relieving hole, each said hole being directed substantially parallel to said axis of each of said frustums.

4. A structure as recited in claim 3 in which the radially inward smallest diameter portions of said struts have circularly cylindrical segmental surfaces for attachment to and mating with a circularly cylindrical surface.

5. A structure comprising:
two glass conical structural members rigidly attached together, with their axes coaxial, at their radially largest diameter portions, said members being formed of axially and radially directed struts;
said members being formed at their radially smallest diameter portions to fit onto and mate with a cylindrical mounting post.

6. In combination:
a ring laser frame, having a central opening about its sensing axis;
a structural support member in the shape of two substantially conical frustums attached together at their largest diameter portions, with their axes coaxial, and to the periphery of said central opening of said frame;
said support member being slotted with axially and radially directed slots to form axially and radially directed struts therebetween;
said struts having surfaces at their smallest diameter portions for attachment in mating relation to a post member, the angles of said frustums and said struts being such that when said support member is attached to a post member, thermal expansion of such post member would produce substantially pure bending of said struts.

7. A structure as recited in claim 6 in which said attached frustums are inverted with respect to each other.

8. A structure as recited in claim 7 in which said frustums are right frustums, said central opening is substantially circular, said structural support member is attached to and surrounded by said frame in the region of attachment together of said frustums, and said struts have surfaces on their smallest diameter end for engaging and mating with a circularly cylindrical post member.

9. A structure as recited in claim 5 in which said conical members are inverted with respect to each other.

10. A structure as recited in claim 9 in which said conical members are right frustums, and said struts have surfaces on their smallest diameter portion to fit onto and mate with a right circularly cylindrical post.

11. A structure as recited in claim 1 in which said frustums are inverted with respect to each other.

12. A structure as recited in claim 11 in which said frustums are right frustums, and said struts have surfaces on their smallest diameter portion to fit onto and mate with a right circularly cylindrical post.

* * * * *

UNITED STATES PATENT AND TRADEMARK OFFICE
CERTIFICATE OF CORRECTION

PATENT NO. : 4,634,091

DATED : January 6, 1987

INVENTOR(S) : Alfred L. Butler

It is certified that error appears in the above-identified patent and that said Letters Patent is hereby corrected as shown below:

In Column 1, between lines 4 and 5, after "BACKGROUND OF THE INVENTION", insert the following paragraph:

--The U. S. Government has a paid-up license in this invention and the right in limited circumstances to require the patent owner to license others on reasonable terms as provided for by the terms of Contract No. F04704-84-C-0057 awarded by Ballistic Missile Office of the Air Force Systems Command.--

Signed and Sealed this

First Day of September, 1987

Attest:

DONALD J. QUIGG

Attesting Officer

Commissioner of Patents and Trademarks